(12) United States Patent
Suga

(10) Patent No.: US 7,897,096 B2
(45) Date of Patent: Mar. 1, 2011

(54) PRODUCTION PROCESS FOR INSERT DECORATED MOLDING

(75) Inventor: Kazuhiro Suga, Saitama (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 0 days.

(21) Appl. No.: 12/232,850

(22) Filed: Sep. 25, 2008

(65) Prior Publication Data

US 2009/0096122 A1  Apr. 16, 2009

(30) Foreign Application Priority Data

Sep. 28, 2007  (JP) .............................. 2007-256748

(51) Int. Cl.
*B29C 45/16* (2006.01)
(52) U.S. Cl. .................... 264/510; 264/259; 264/297.8; 264/553
(58) Field of Classification Search .................. 264/101, 264/261, 267, 275, 511, 513, 516, 544, 553, 264/571, 259, 297.8, 510, 277; 425/112
See application file for complete search history.

(56) References Cited

U.S. PATENT DOCUMENTS 5,997,675 A * 12/1999 Miyake et al. ............... 156/222
2001/0011786 A1* 8/2001 Naritomi ..................... 264/513

FOREIGN PATENT DOCUMENTS

| GB | 2 350 583 A | | 12/2000 |
|---|---|---|---|
| JP | 2000-254938 | | 9/2000 |
| JP | 2001225350 A | * | 8/2001 |
| JP | 2007245647 A | * | 9/2007 |

* cited by examiner

*Primary Examiner*—Joseph S Del Sole
*Assistant Examiner*—Ninh V Le
(74) *Attorney, Agent, or Firm*—Antonelli, Terry, Stout & Kraus, LLP.

(57) ABSTRACT

Provided is a production process for an insert decorated molding provided with two or more kinds of pictures, in which a color of a resin is not seen from a boundary part between pictures and which has a high design property. The production process includes a vacuum molding step in which two or more kinds of decorative sheets are vacuum-molded and an injection step in which at least two kinds of the vacuum-molded decorative sheets are disposed in line in a female metal die and in which a molding resin is injected onto the decorative sheets.

7 Claims, 5 Drawing Sheets

BACKGROUND

BACKGROUND vacuum molding

PRODUCTION PROCESS FOR INSERT DECORATED MOLDING

BACKGROUND OF THE INVENTION

1. Field of the Invention

The present invention relates to a production process for insert decorated moldings for forming various decorated moldings for vehicles, houses, furnitures and the like.

2. Related Art

Various trials have so far been made in order to meet the desire that two or more kinds of continuous pictures are provided in a molding step of plastic moldings. Available is, for example, a method in which a plastic molding is provided with two or more kinds of continuous pictures by an in-mold method in producing decorated moldings. That is, it is a method in which a base film is provided with two or more kinds of continuous pictures and in which the pictures are transferred onto a plastic molding in a metal die.

However, though the above method is effective when drawing is small, registration of pictures is difficult when it is applied to deeply drawn moldings, and the moldings are provided with a low design property.

Further, a method in which two or more kinds of continuous pictures are provided by a hydraulic transfer method is available. However, a mask has to be coated, and the work is complicated. In addition thereto, a solvent which exerts a high load on the environment has to be used, and therefore it is not necessarily a preferred method.

On the other hand, a method in which two or more kinds of pictures are provided is proposed as well in an insert molding method. It is, for example, a method in which in a case where decorations such as woodgrain patterns are provided on one face of a tabular resin molding and where a metal lustrous layer is formed on the other face, a decorative sheet on which woodgrain patterns are formed and a decorative sheet on which metal lustrous patterns are formed are disposed in a metal die and in which a molten resin is injected between two decorative sheets to provide the decorative films integrally on both faces thereof at the same time as forming a resin molding (refer to a patent document 1).

However, though the above method is applicable in a case where two kinds of decorative sheets are provided apart, it is difficult to apply it when two kinds of pictures are continuously provided. That is, two sheets of the decorative sheets are shrunk in injection molding, and therefore it is difficult to allow the end parts thereof to stay in a state in which they are completely brought into contact with each other; as shown in FIG. 1, a gap S is formed at a boundary part between two kinds of a decorative sheet 10a and a decorative sheet 10b, and a molten resin flows thereinto. This allows the color of the resin to be observed at the boundary part between two kinds of the continuous pictures when the molding is formed, and the design property is damaged.

On the other hand, if two kinds of the decorative sheets 10a and 10b are superposed as shown in FIG. 2 so that a gap is not produced at a boundary part between two kinds of the pictures, the resin is not penetrated into a part L in which the decorative sheets are overlapped, and therefore the decorative sheets are not adhered to the resin molding at the part. Thus, the decorative sheets stay in the state that they are partially peeled off, and they are reduced in a design property.

Patent Document 1: Japanese Patent Application Laid-Open No. 254938/2000

SUMMARY OF THE INVENTION

The present invention has been made in order to solve the problems described above, and an object of the present invention is to provide a method in which a molding is provided with two or more kinds of continuous pictures in an insert molding method, that is, a production process for an insert decorated molding in which a color of a resin can not be seen from a boundary part between pictures and which has a high design property.

Intensive researches repeated by the present inventors in order to achieve the object described above have resulted in finding that the object can be achieved by controlling a length of an upper base part and a half value width in a convex part of a female metal die separating two kinds of adjacent decorative sheets to specific lengths and setting a position of an end part of the decorative sheet to a side face of the convex part in the above female metal die. The present invention has been completed based the above knowledge.

That is, the present invention provides the following items.

(1) A production process for an insert decorated molding comprising a vacuum molding step in which two or more kinds of decorative sheets are vacuum-molded and an injection step in which at least two kinds of the vacuum-molded decorative sheets are disposed in line in a female metal die and in which a molding resin is injected onto the above decorative sheets, wherein a length of an upper base part in a convex part of the female metal die separating the adjacent decorative sheets is 10 to 75% of a wall thickness of the molding resin, and a length of the half value width is a length which is 1 to 5 times as large as a length of the above upper base part; end parts which are close to each other in the adjacent decorative sheets are positioned at a side face of the convex part in the above female metal die and are not protruded ahead of a front end of the above convex part, (2) the production process for an insert decorated molding as described in the above item (1), wherein a wall thickness of the molding resin is 2 to 0.5 mm and (3) the production process for an insert decorated molding as described in the above item (1) or (2), wherein the above decorative sheet comprises a decorative layer and a backer layer; a base material constituting the decorative layer is an acryl resin; and the backer layer is constituted from an ABS resin.

According to the present invention, capable of being provided is a production process for an insert decorated molding in which the molding can be provided with two or more kinds of continuous pictures, in which a color of a resin can not be seen from a boundary part between the pictures and which has a high design property.

Figure 1:
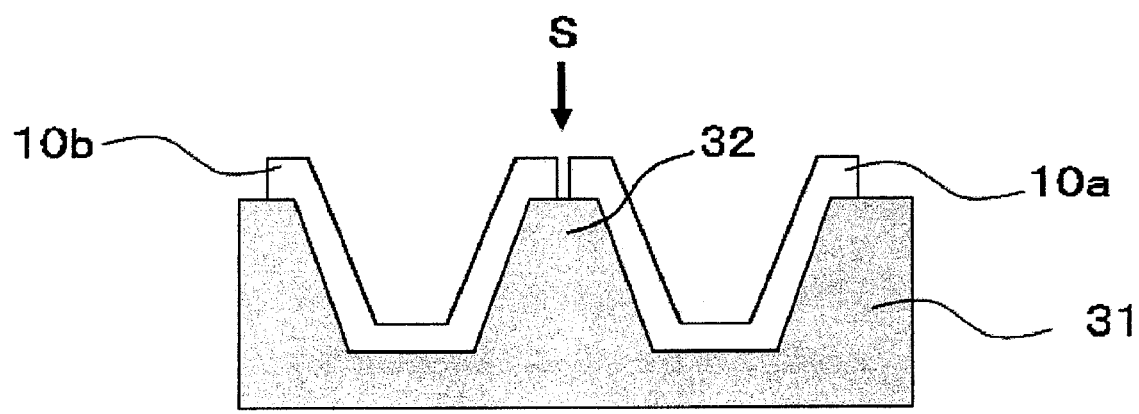
FIG. 1 is a schematic drawing showing an insert decorative molding method for explaining the problem in the present invention.
Figure 2:
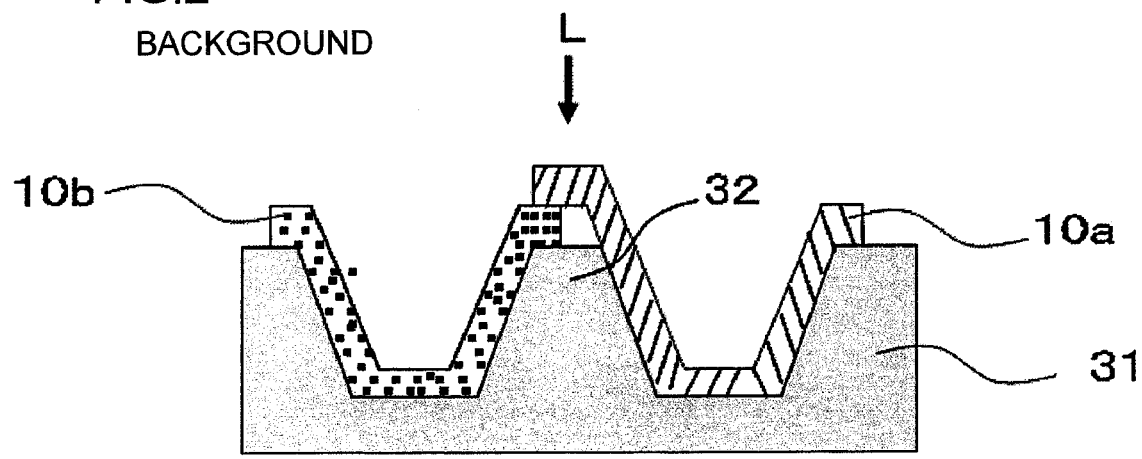
FIG. 2 is a schematic drawing showing an insert decorative molding method for explaining the problem in the present invention.

EXPLANATIONS OF THE CODES 10, 10a, 10b: Decorative sheets
11: Decorative layer
12: Backer layer
13a, 13b: End parts of decorative sheets
101: Convex part of a decorative sheet
102: Sword guard-like part of a decorative sheet
21: Vacuum molding metal die
22, 22': Heaters
31: Injection molding metal die (female metal die)
32: Convex part of a female metal die separating two kinds of decorative sheets
32a: Front end of a convex part in a female metal die separating two kinds of decorative sheets
33: Injection molding metal die (male metal die)
S: Gap
L: Overlapped part of two kinds of decorative sheets
P: Molding resin
G: Gate
x: Length of an upper base part of a convex part in female metal die
y: Half value width of a convex part in a female metal die
z: Length from a bottom face part up to an upper base part in which decorative sheets are disposed

BEST MODE FOR CARRYING OUT THE INVENTION

Figure 3:
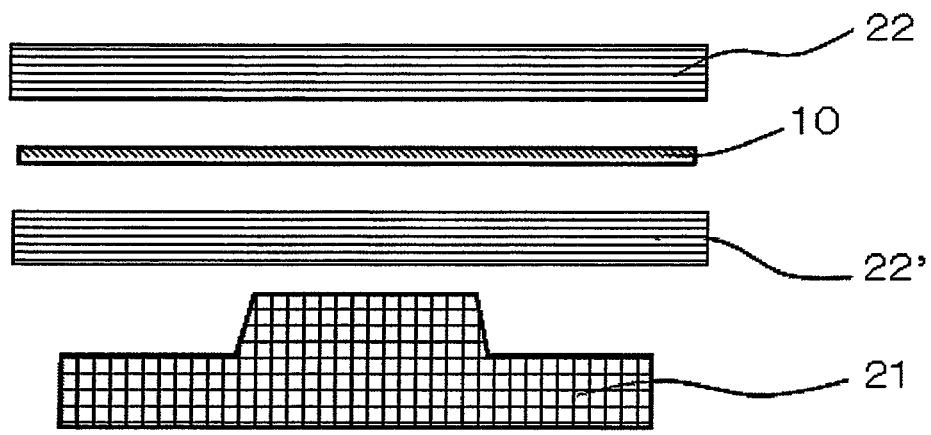
FIG. 3 is a step schematic drawing showing a heating stage before vacuum molding in a vacuum molding step in the production process of the present invention for an insert decorated molding.
Figure 4:
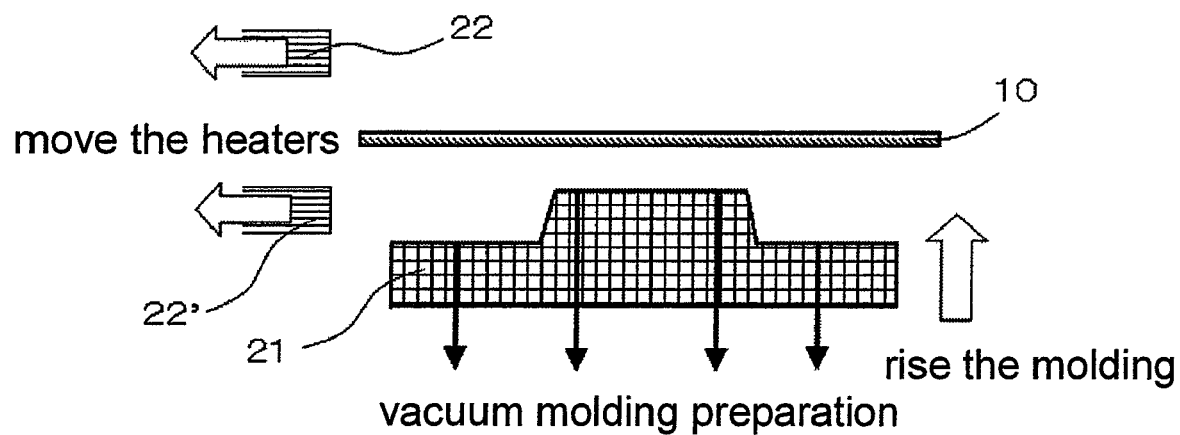
FIG. 4 is a step schematic drawing showing a vacuum molding preparatory stage after finishing a heating stage in a vacuum molding step in the production process of the present invention for an insert decorated molding.
Figure 5:
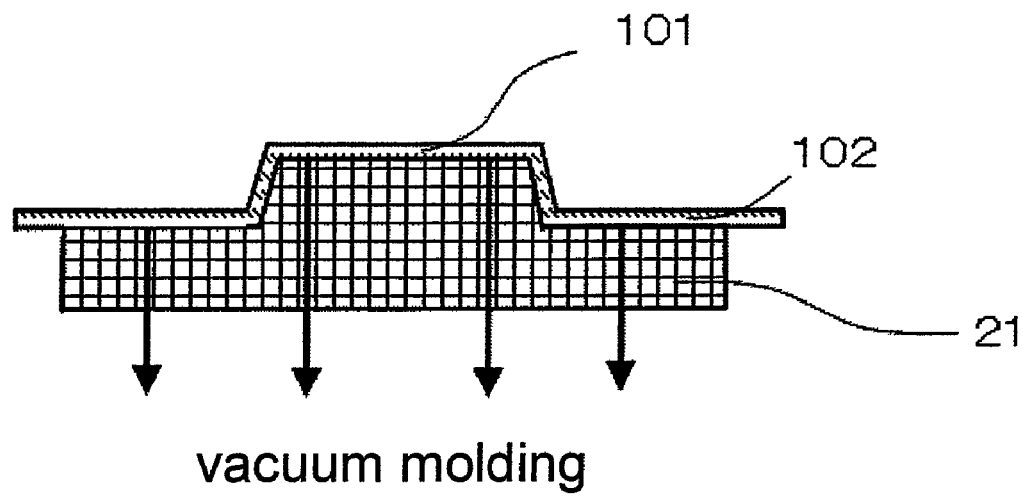
FIG. 5 is a step schematic drawing showing vacuum molding in a vacuum molding step in the production process of the present invention for an insert decorated molding.

The production process of the present invention for an insert decorated molding shall be explained below with reference to drawings. FIG. 3 is a step schematic drawing showing a heating stage before vacuum molding in a vacuum molding step in the production process of the present invention for an insert decorated molding. FIG. 4 is a step schematic drawing showing a vacuum molding preparatory stage after finishing a heating stage in a vacuum molding step in the production process of the present invention for an insert decorated molding. FIG. 5 is a step schematic drawing showing vacuum molding in a vacuum molding step in the production process of the present invention for an insert decorated molding.

In the vacuum molding step, a decorative sheet 10 used in the production process of the present invention is heated, as shown in FIG. 3, usually to 140 to 180° C. by heaters 22 and 22' prior to vacuum molding. The decorative sheet 10 softened by heating is loaded, as shown in FIG. 4 and FIG. 5, in a vacuum molding metal die 21 and vacuum-molded so that a convex part 101 and a sword guard-like part 102 continuing to the convex part 101 are formed by vacuum molding.

Figure 6:
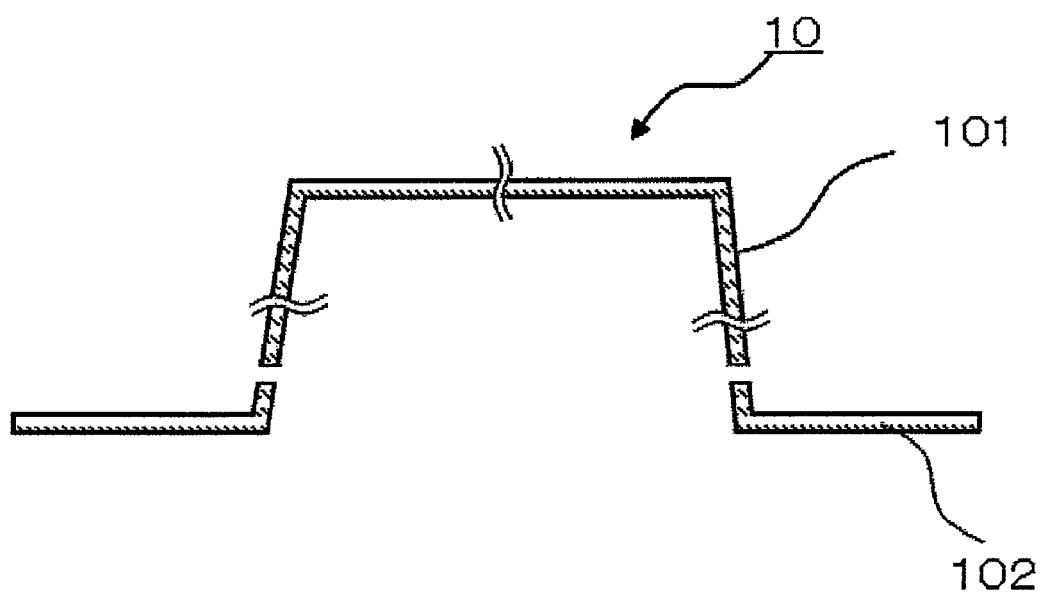
FIG. 6 is a schematic drawing showing a cross section of a trimmed decorative sheet in the production process of the present invention for an insert decorated molding.
Figure 7:
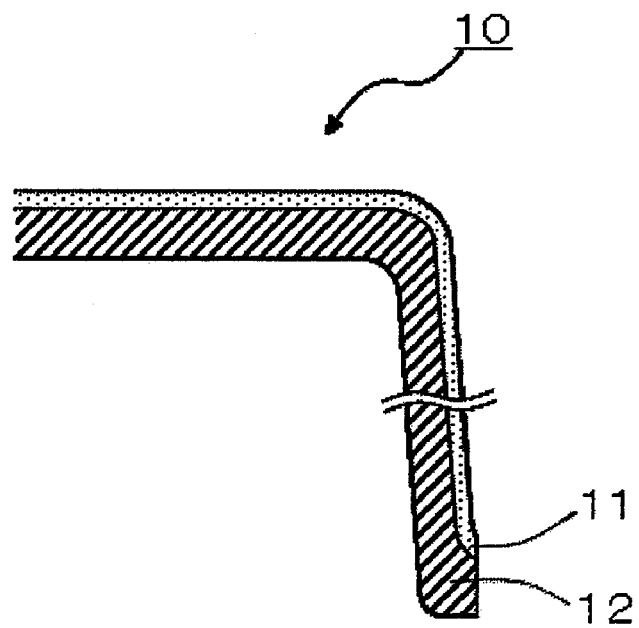
FIG. 7 is a schematic drawing showing a partial cross section of a trimmed decorative sheet.

Next, the decorative sheet is trimmed, as described later in details, in a trimming step so that it is positioned at a side face of a convex part 32 in a female metal die separating two kinds of the adjacent decorative sheets and that it has a length which is not protruded ahead of a front end of the above convex part. A cross-sectional schematic drawing of the decorative sheet 10 is shown in FIG. 6 and FIG. 7. The decorative sheet is trimmed at a side face part of a convex part 101, and an end part thereof is usually trimmed as shown in FIG. 7. The trimming step may be carried out immediately after vacuum molding in the vacuum molding step.

A thickness of the decorative sheet 10 is usually 200 to 800 µm, and a thickness of the backer layer in a thickness of the decorative sheet is usually 100 to 500 µm.

The production process of the decorative sheet shall not specifically be restricted, and it can be obtained, for example, by forming a picture layer on a substrate sheet, laminating thereon in order a masking layer and an adhesive layer to obtain a decorative layer and adhering the decorative layer and a backer layer comprising an ABS resin by dry lamination to integrate them. Further, the production process includes a process in which a peeling layer is formed on a substrate sheet, in which a picture layer and an adhesive layer are formed thereon to prepare a transfer foil which is a decorative layer, in which the above transfer foil and a backer layer obtained by extruding an ABS resin by a T die method are laminated thereon and in which the substrate sheet is then peeled off.

Figure 8:
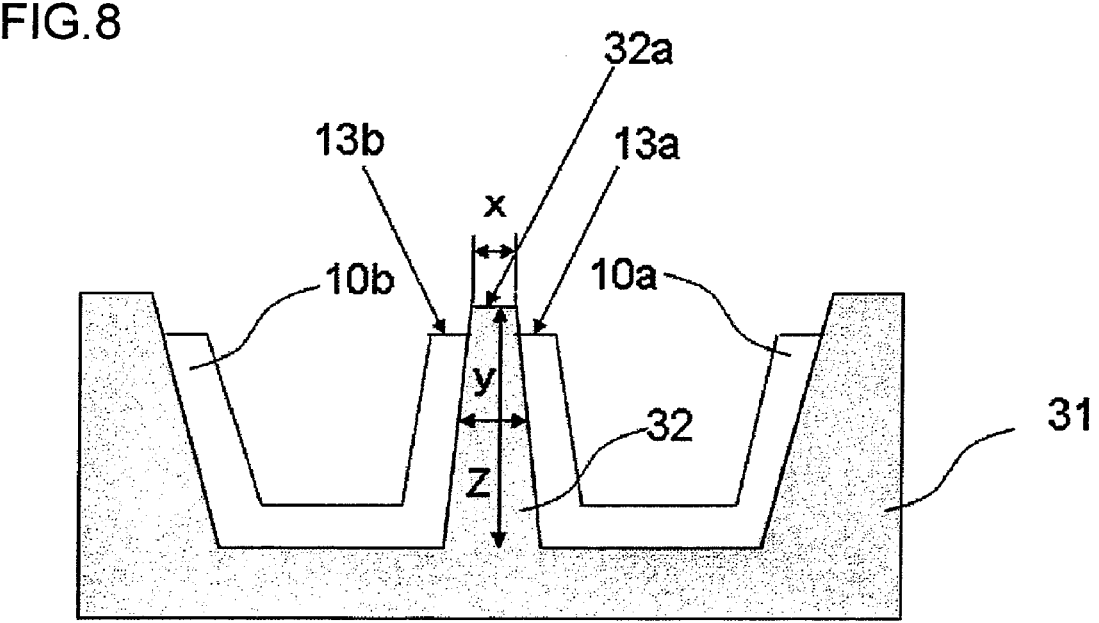
FIG. 8 is a step schematic drawing showing a preparatory stage of injection molding in the production process of the present invention for an insert decorated molding.

FIG. 8 is a step schematic drawing showing a preparatory stage of injection molding in the production process of the present invention for an insert decorated molding. A case in which two kinds of decorative sheets are used shall be explained below as an example thereof, but in the present invention, it can be applied as well to a case in which further more decorative sheets are used.

In the production process of the present invention, at least two kinds of decorative sheets 10a and 10b are disposed in a parallel state adjacently to a female metal die 31, wherein a length x of an upper base part in a convex part 32 of the female metal die separating two kinds of the above decorative sheets is 10 to 75% of a wall thickness of a molding resin, and a length y of the half value width is a length which is 1 to 5 times as large as a length x of the above upper base part; and end parts 13a and 13b which are close to each other in two kinds of the decorative sheets 10a and 10b described above are positioned at a side face of the convex part 32 in the above female metal die and are not protruded ahead of a front end 32a of the above convex part.

If a length x of the upper base part in the convex part 32 of the female metal die separating the adjacent decorative sheets is too small as compared with a wall thickness of the molding resin, it is difficult to prepare the metal die, and in addition thereto, such problems on a durability that the metal die is broken are brought about in a certain case. On the other hand, if the above length x is too large as compared with a wall thickness of the molding resin, the color of the resin is seen from a boundary part of the pictures, and a design property of the decorated molding is deteriorated. Accordingly, a length x of the upper base part in the convex part 32 of the female metal die falls in a range of preferably 10 to 75%, more preferably 15 to 50% of a wall thickness of the molding resin.

A wall thickness of the molding resin is suitably determined according to the uses and the like, and it falls preferably in a range of 2 to 5 mm. If the wall thickness is 2 mm or more, the form of the molding is maintained sufficiently well. On the other hand, if it is 5 mm or less, a weight of the molding is not large in excess, and handling is easy. In addition thereto, economical merits are involved therein. A wall thickness of the molding resin falls more preferably in a range of 2.5 to 4 mm.

If a length y of a half value width in the convex part 32 of the female metal die is less than 1 based on a length x of the above upper base part, it is difficult to release the decorated molding from the metal die after injection-molding. On the other hand, if it exceeds 5 times, the color of the resin is seen from a boundary part of the pictures, and a design property of the decorated molding is deteriorated. Accordingly, a length y of the half value width falls in a range of preferably 1 to 5 times, more preferably 1 to 3 times. In this regard, a half value width of the convex part 32 in the female metal die shows a width in a part having a height of ½ of a length z from the bottom face part up to the upper base part of the female metal die 31 in which the decorative sheets are disposed.

Figure 9:
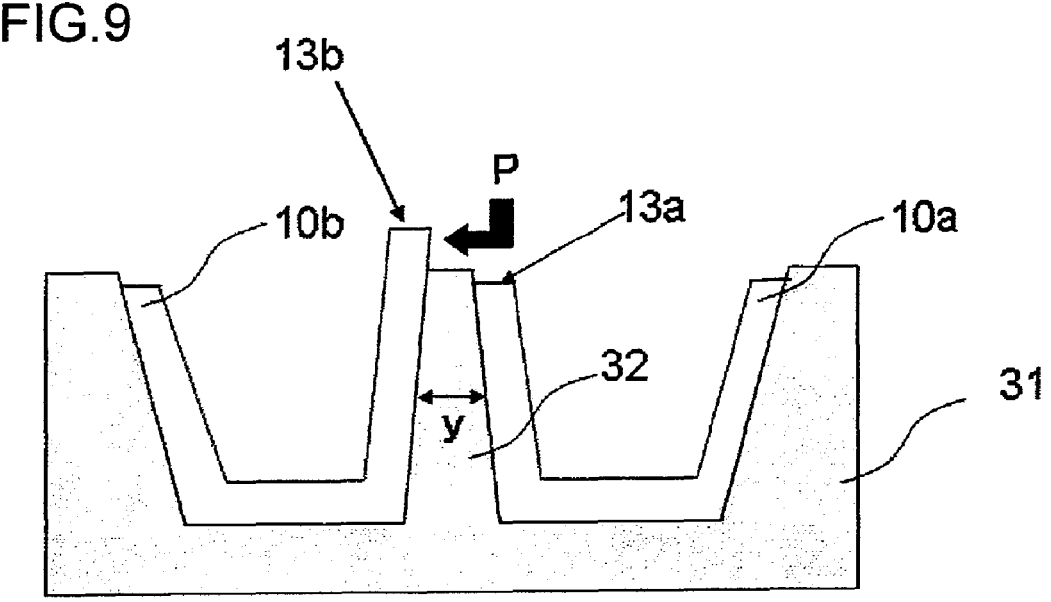
FIG. 9 is a step schematic drawing for explaining a comparative object in the present invention in a preparatory stage of injection molding.

In the present invention, it is essential that both of end parts 13a and 13b which are close to each other in two kinds of the adjacent decorative sheets are positioned at a side face of the convex part 32 in the female metal die 31 and are not protruded ahead of a front end 32a of the above convex part 32. When the end part 13b is protruded, as shown in, for example, FIG. 9, ahead of the front end of the convex part 32, the molding resin P is likely to flow in from the front end of the above convex part 32 through the end part 13b of the decorative sheet, and insert decorative molding can not be carried out in a certain case.

Figure 10:
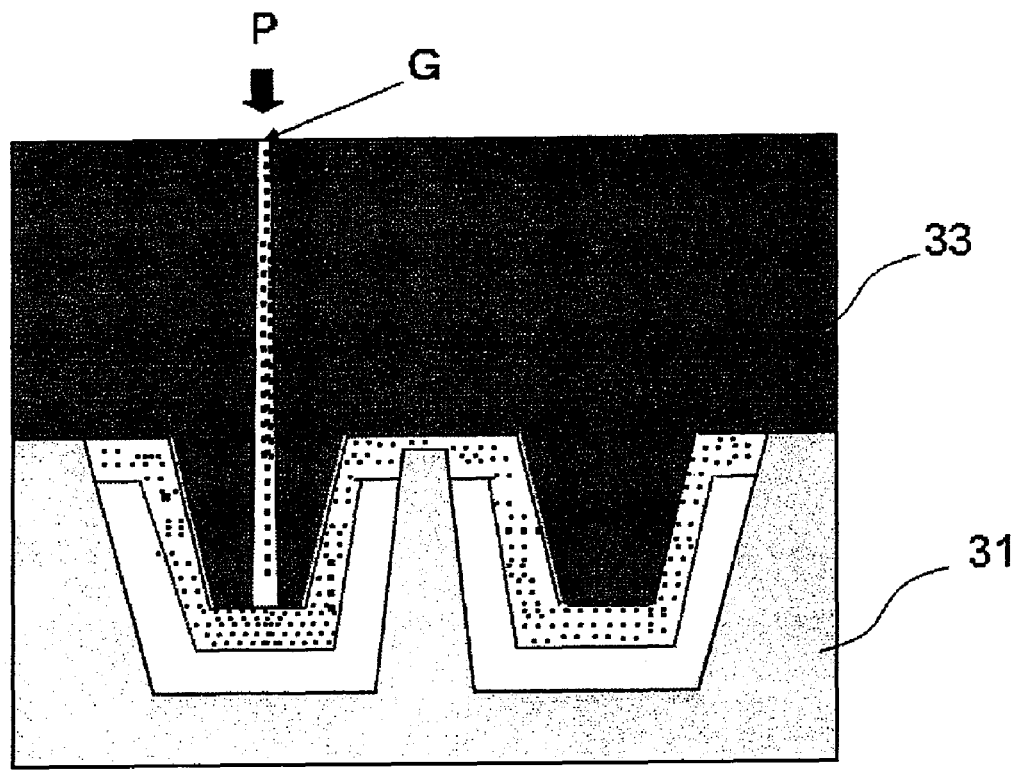
FIG. 10 is a step schematic drawing showing immediately after injection molding in the production process of the present invention for an insert decorated molding.

Next, FIG. 10 is a step schematic drawing showing immediately after injection molding in the production process of the present invention for an insert decorated molding. A male metal die 33 and a female metal die 31 are clamped, and a molding resin P is injected from a gate G. The molding resin P is injected usually at a temperature of 200 to 260° C. and a injection pressure of 20 to 300 MPa. The position of the gate G shall not specifically be restricted, and plural gates may be present.

In a decorative layer 11 of the decorative sheet 10 used in the production process of the present invention for an insert decorated molding, a picture layer and/or a masking layer are laminated in this order on a substrate sheet, and an adhesive layer is further laminated thereon if desired.

The substrate sheet is selected considering the vacuum molding aptitude, and a resin sheet comprising a thermoplastic resin is typically used. In general, used as the above thermoplastic resin are acryl resins (including mixtures of two or more kinds of acryl resins), polyolefin base resins such as polypropylene, polyethylene and the like, polycarbonate resins, ABS resins and the like. The substrate sheet is used in the form of a single layer sheet comprising the above resins or a plural layer sheet comprising the same resin or different resins.

In the present invention, the acryl resins are preferred, and to be more specific, they include, for example, polymethyl (meth)acrylate, polyethyl (meth)acrylate, polybutyl (meth) acrylate, methyl (meth)acrylate-butyl (meth)acrylate copolymers, methyl (meth)acrylate-styrene copolymers and the like. In this regard, (meth)acrylate shows acrylate or methacrylate.

A thickness of the substrate sheet is selected according to the uses and is usually 20 to 500 μm, and it is preferably 50 to 300 μm considering a cost, a printing aptitude and a surface smoothness.

The pictures of the picture layer include, for example, woodgrain patterns, marble grain patterns, sand grain patterns, tiling patterns, brick-laid patterns, texture grain patterns, leather grain patterns, letters, signals, graphics and geometric patterns, and in addition thereto, they include as well metallic patterns and the like.

Publicly known inks can be used as an ink for the picture layer according to the uses. Used for the binder resin are acryl resins, mixtures of acryl resins and vinyl chloride-vinyl acetate copolymers, urethane resins, cellulose base resins and the like. Used for the colorant are inorganic pigments such as titan white, carbon black, red iron oxide, cobalt blue and the like, organic pigments such as phthalocyanine blue isoindolinone, quinacridone and the like, metallic pigments such as aluminum powder and the like, pearl pigments such as titanium dioxide, coated mica powder and the like and dyes.

The masking layer is an overall solid layer, and the same binder resin, pigment, dye and the like as used in the picture layer are used therefor.

Suited methods which have so far been publicly known, such as gravure printing, offset printing, letterpress printing, screen printing, ink jet printing and the like are employed for printing the picture layer or the masking layer. The masking layer is preferably formed by a coating method such as gravure coating, roll coating and the like.

A thickness of the picture layer can suitably be selected according to the picture patterns. A thickness of the masking layer is 1 to 10 μm, and it is usually 1 to 5 μm in the case of gravure printing.

In the adhesive layer which is laminated if necessary, used according to the backer layer are thermoplastic resins, curable resins, rubber base resins, to be specific, for example, urethane resins (for example, two-component curing type urethane resins), chlorinated polyolefins such as chlorinated polypropylene and the like, acryl resins, vinyl chloride-vinyl acetate copolymers, polyester resins, polyamide resins and the like. A thickness of the adhesive layer can suitably be changed according to the physical properties required and the like, and it is usually 1 to 20 μm. A method for forming the adhesive layer shall not specifically be restricted, and it is formed usually by coating an ink or a coating liquid comprising a resin liquid obtained by diluting the resins described above by a diluting solvent by publicly known printing or coating means such as gravure printing, roll coating and the like. The adhesive layer may be coated on the backer layer 12.

The backer layer 12 for the decorative sheet 10 used in the production process of the present invention for an insert decorated molding comprises preferably an ABS resin, a polyolefin resin, a styrene resin, an acryl resin, a vinyl chloride resin, a polycarbonate resin or the like. Among the above resins, an ABS resin and a polypropylene resin are particularly preferred. When the molding resin P is an ABS resin, the ABS resin is usually used for the backer layer, and when it is a polypropylene resin, the polypropylene resin is usually used therefor. In the present invention, a case in which the backer layer comprises an ABS resin is most preferred.

The decorative sheet 10 used in the present invention is produced usually by a method in which the decorative layer 11 is integrated with the backer layer 12 via the adhesive layer by dry lamination or a method in which the backer resin is adhered on the decorative layer by lamination immediately after extruded from a T die to integrate them.

EXAMPLES

Next, the present invention shall be explained in further details with reference to examples, but the present invention shall by no means be restricted by the examples shown below.

An appearance of an insert decorated molding was visually evaluated.

Example 1

(1) Production of First Decorative Sheet:

A woodgrain picture layer (thickness: 1 μm) was formed on a substrate sheet (thickness: 75 μm) comprising a polymethyl methacrylate resin by gravure printing using an ink composition prepared by adding an organic color pigment comprising phthalocyanine blue, isoindolinone and quinacridone to an acryl resin and a vinyl chloride-vinyl acetate copolymer resin. Then, a masking layer (thickness: 2 μm) comprising a mixture of polymethyl methacrylate and polybutyl methacrylate and an inorganic pigment and an adhesive layer (thickness: 10 μm) comprising a two-component curing type urethane resin base adhesive were laminated in order to obtain a decorative layer 11, and it was adhered to a backer layer 12 comprising a black ABS resin by dry lamination and integrated therewith to obtain a decorative sheet 10a having a thickness of 400 μm.

(2) Production of Second Decorative Sheet:

A decorative sheet 10b was obtained in the same manner as in (1) described above, except that a picture layer having a metallic pattern was formed on the same substrate sheet as used in producing the first decorative sheet described above by gravure printing using an ink composition prepared by adding an aluminum powder as a pigment to an acryl resin and a vinyl chloride-vinyl acetate copolymer resin.

(3) Vacuum Molding Step:

The decorative sheets 10a and 10b described above each were heated by heaters of about 300° C. until the decorative sheets reached a temperature of about 160° C. The decorative sheets 10a and 10b which were softened by heating were loaded in a vacuum molding metal die 21 and subjected to vacuum molding by vacuum suction so that a convex part 101 and a sword guard-like part 102 continuing to the convex part 101 were formed.

Next, the decorative sheets 10a and 10b subjected to vacuum molding were trimmed as shown in FIG. 6 to obtain decorative sheets 10a and 10b.

(4) Injection Molding Step:

The decorative sheets 10a and 10b described above were disposed in a female metal die 31 as shown in FIG. 8. A length x of an upper base part in a convex part 32 of the female metal die 31 was set to 1 mm, and a half value width y of the convex part 32 in the female metal die 31 was set to 1.5 mm. Then, a male metal die 33 and the female metal die 31 were clamped as shown in FIG. 10, and a molding resin P comprising a black ABS resin was injected into the cavity from a gate G at an injection temperature of 240° C. and an injection pressure of 100 MPa to obtain an insert decorated molding. A wall thickness of the resin was set to 3 mm.

(5) Evaluation Results:

The black ABS resin was not seen from a boundary part between the woodgrain pattern and the metallic pattern, and the insert decorated molding having a high design property was obtained.

Example 2

An insert decorated molding was obtained in the same manner as in Example 1, except that in Example 1, a length x of the upper base part in the convex part 32 of the female metal die 31 was set to 1 mm; a half value width y of the convex part 32 in the female metal die 31 was set to 2.5 mm; and a wall thickness of the resin was set to 3 mm. The black ABS resin was not seen, as was the case with Example 1, from a boundary part between the woodgrain pattern and the metallic pattern, and the insert decorated molding having a high design property was obtained.

Example 3

An insert decorated molding was obtained in the same manner as in Example 1, except that in Example 1, a length x of the upper base part in the convex part 32 of the female metal die 31 was set to 1.5 mm; a half value width y of the convex part 32 in the female metal die 31 was set to 2 mm; and a wall thickness of the resin was set to 3 mm. The black ABS resin was not seen, as was the case with Example 1, from a boundary part between the woodgrain pattern and the metallic pattern, and the insert decorated molding having a high design property was obtained.

Example 4

An insert decorated molding was obtained in the same manner as in Example 1, except that in Example 1, a length x of the upper base part in the convex part 32 of the female metal die 31 was set to 0.6 mm; a half value width y of the convex part 32 in the female metal die 31 was set to 1.2 mm; and a wall thickness of the resin was set to 4 mm. The black ABS resin was not seen, as was the case with Example 1, from a boundary part between the woodgrain pattern and the metallic pattern, and the insert decorated molding having a high design property was obtained.

Example 5

An insert decorated molding was obtained in the same manner as in Example 1, except that the first decorative sheet and the second decorative sheet were produced by the following methods.

(1) Production of First Decorative Sheet:

A peeling layer comprising an acryl resin as a principal component was formed on a PET (polyethylene terephthalate resin) film having a thickness of 25 μm by gravure printing so that a thickness after drying was 3 μm. Next, a woodgrain picture layer (thickness: 1 μm) was formed thereon by gravure printing using an ink composition prepared by adding an organic color pigment comprising phthalocyanine blue, isoindolinone and quinacridone to an acryl resin and a vinyl chloride-vinyl acetate copolymer resin. A thermosensitive adhesive layer comprising a vinyl chloride-vinyl acetate copolymer was further formed on the above picture layer by gravure printing so that a thickness after drying was 2 μm to obtain a transfer foil which was a decorative layer.

Next, a black ABS resin extruded by a T die method was laminated thereon so that it was brought into contact with a thermosensitive adhesive face of the transfer foil described above. The extruded ABS resin was cooled down, and then the PET film which was the substrate was peeled off to obtain a first decorative sheet 10a having a thickness of 400 μm.

(2) Production of Second Decorative Sheet:

A decorative sheet 10b was obtained in the same manner as in (1) described above, except that in producing the first decorative sheet described above, an ink composition prepared by adding an aluminum powder as a pigment to an acryl resin and a vinyl chloride-vinyl acetate copolymer resin was used as an ink composition for forming the picture to provide the decorative sheet with a metallic pattern.

(5) Evaluation Results:

The black ABS resin was not seen, as was the case with Example 1, from a boundary part between the woodgrain pattern and the metallic pattern, and the insert decorated molding having a high design property was obtained.

Comparative Example 1

An insert decorated molding was obtained in the same manner as in Example 1, except that in Example 1, a length x of the upper base part in the convex part 32 of the female metal die 31 was set to 3 mm and that a half value width y thereof was set to 5 mm. The black ABS resin was seen from a boundary part between the woodgrain pattern and the metallic pattern, and the design property was inferior.

INDUSTRIAL APPLICABILITY

According to the present invention, obtained is an insert decorated molding provided with two or more kinds of continuous pictures, in which a color of the resin is not seen from a boundary part between the pictures and which has a high design property. The above insert decorated molding is suitably used for various interior products and exterior products for automobiles, interior goods for buildings and houses, furnitures, high class miscellaneous goods for daily use and the like.

What is claimed is:

1. A production process for an insert decorated molding comprising a vacuum molding step in which two or more kinds of decorative sheets are vacuum-molded and an injection step in which at least two kinds of the vacuum-molded decorative sheets are disposed in line in a female metal die and in which a molding resin is injected onto the above decorative sheets, wherein a length of an upper base part in a convex part of the female metal die separating the adjacent decorative sheets is 10 to 75% of a wall thickness of the molding resin, and a length of a half value width of the convex part of the female metal die is a length which is 1 to 5 times as large as a length of the above upper base part; end parts of adjacent decorative sheets which are close to each other are positioned at a side face of the convex part in the above female metal die and are not protruded ahead of a front end of the convex part of the female metal die.

2. The production process for an insert decorated molding as described in claim 1, wherein a wall thickness of the molding resin is 2 to 5 mm.

3. The production process for an insert decorated molding as described in claim 1 wherein the above decorative sheet comprises a decorative layer and a backer layer; a base material constituting the decorative layer is an acryl resin; and the backer layer is constituted from an ABS resin.

4. The production process for an insert decorated molding as described in claim 2 wherein the above decorative sheet comprises a decorative layer and a backer layer; a base material constituting the decorative layer is an acryl resin; and the backer layer is constituted from an ABS resin.

5. The production process for an insert decorated molding as described in claim 1, wherein a thickness of the decorative sheet is 200 to 800 µm.

6. The production process for an insert decorated molding as described in claim 1, wherein said length of the upper base part in a convex part of the female metal die separating the adjacent decorative sheets is 15 to 50% of the wall thickness of the molding resin.

7. The production process for an insert decorated molding as described in claim 2, wherein said wall thickness of the molding resin is 2.5 to 4 mm.

\* \* \* \* \*